US 6,634,469 B2

(12) United States Patent
Störzel et al.

(10) Patent No.: US 6,634,469 B2
(45) Date of Patent: Oct. 21, 2003

(54) SPOT-TYPE DISC BRAKE WITH A RETAINING DEVICE FOR A BRAKE PAD

(75) Inventors: Karl Störzel, Dreieich (DE); Holger Krug, Bad Homburg (DE); Rudolf Platzer, Frankfurt (DE)

(73) Assignee: Continental Teves, AG & Co. OHG, Frankfurt (DE)

( * ) Notice: Subject to any disclaimer, the term of this patent is extended or adjusted under 35 U.S.C. 154(b) by 0 days.

(21) Appl. No.: 09/951,669

(22) Filed: Sep. 13, 2001

(65) Prior Publication Data

US 2002/0096404 A1 Jul. 25, 2002

(30) Foreign Application Priority Data

Sep. 14, 2000 (DE) .......................... 100 45 358

(51) Int. Cl.⁷ .............................. F16D 65/40
(52) U.S. Cl. ................. 188/73.38; 188/205 A
(58) Field of Search .................... 188/73.38, 205 A, 188/250 E

(56) References Cited

U.S. PATENT DOCUMENTS

| | | | | |
|---|---|---|---|---|
| 4,467,897 A | * | 8/1984 | Kubo et al. | 188/73.38 |
| 4,609,077 A | * | 9/1986 | Nakatsuhara | 188/73.38 |
| 4,809,825 A | * | 3/1989 | Oltmanns et al. | 188/73.31 |
| 5,494,140 A | * | 2/1996 | Weiler et al. | 188/73.38 |
| 5,701,978 A | * | 12/1997 | Weiler et al. | 188/73.32 |
| 5,704,452 A | * | 1/1998 | Maligne | 188/73.38 |
| 5,706,916 A | * | 1/1998 | Cortes Guasch et al. | 188/73.38 |
| 5,860,495 A | * | 1/1999 | Weiler et al. | 188/73.38 |
| 5,881,848 A | | 3/1999 | Mery et al. | |

FOREIGN PATENT DOCUMENTS

| | | |
|---|---|---|
| DE | 43 18 744 | 9/1994 |
| DE | 43 35 001 | 4/1995 |
| DE | 196 17 373 | 11/1997 |
| DE | 198 57 559 | 6/2000 |
| DE | 199 06 804 | 8/2000 |

OTHER PUBLICATIONS

JP 09 177 846 Patent Abstract of Japan Jul. 11, 1997.

* cited by examiner

Primary Examiner—Jack Lavinder
Assistant Examiner—Robert A. Siconolfi

(57) ABSTRACT

The present invention relates to a spot-type disc brake for automotive vehicles and an associated brake pad with a retaining device for the brake pad (1) on an actuating means (2), with the brake pad (1) being additionally clamped to a pad mounting support. These two functions are assumed by two separate spring means (4, 13) according to the present invention. A first spring means (4) clamps the brake pad (1) axially with respect to the actuating means (2), especially a brake piston, and a second spring means (13) ensures the radially rattle-free clamping engagement of the brake pad (1) with respect to an associated pad mounting support. Both spring means (4, 13) are active irrespective of each other so that undesirable transverse forces on the actuating means (2), i.e., vertically to the axial direction (3), are avoided.

11 Claims, 3 Drawing Sheets

(B-B)

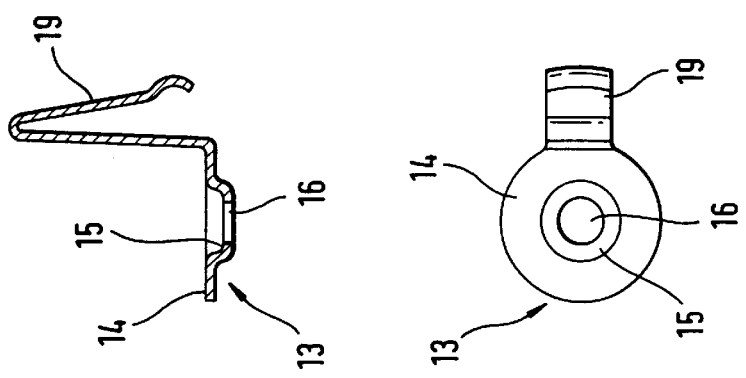
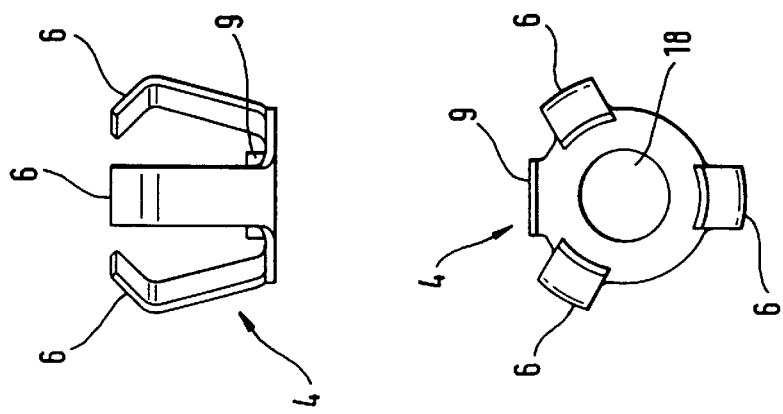
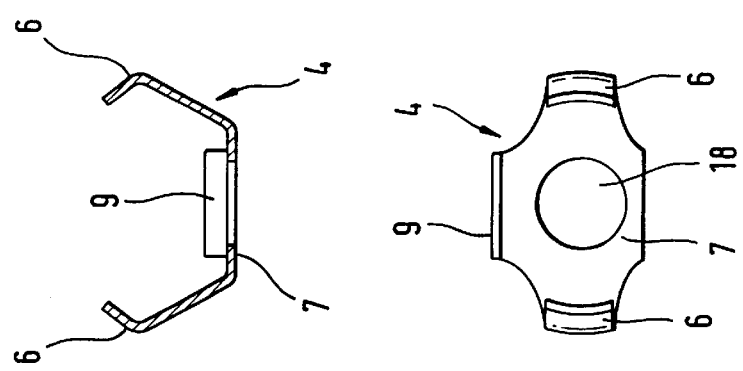

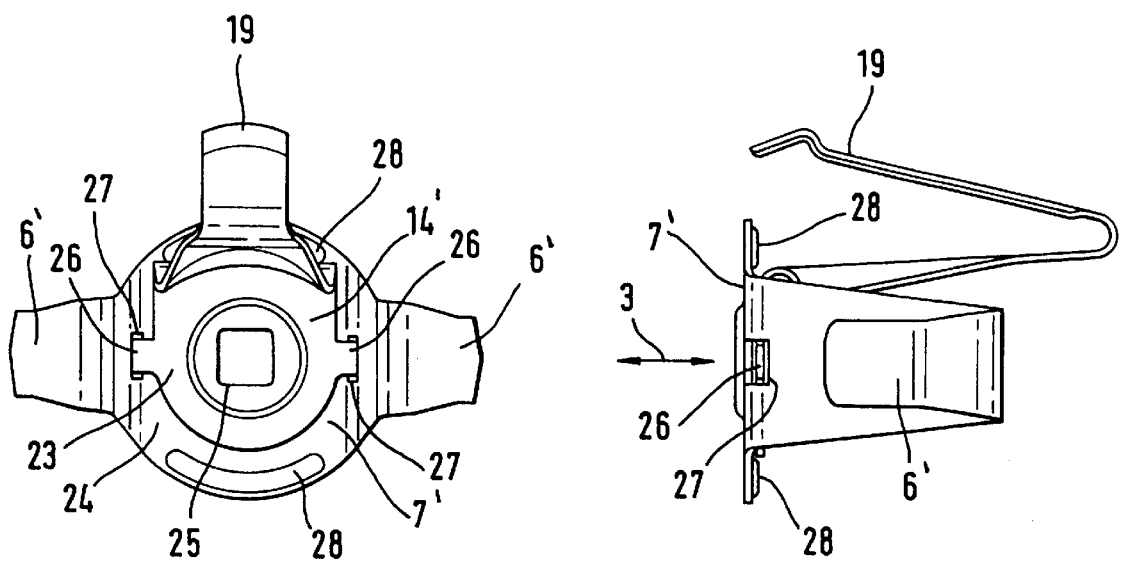
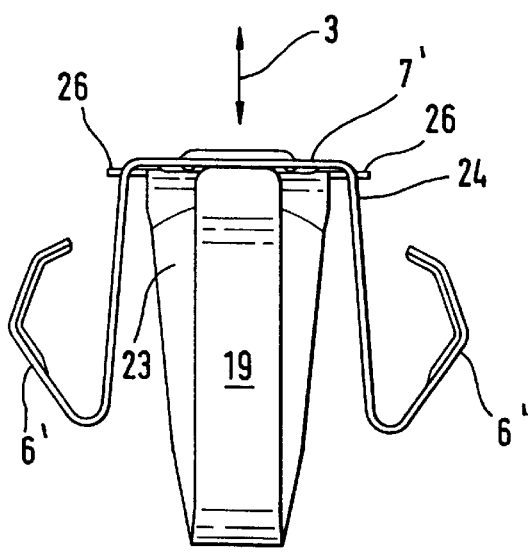
Fig. 6

SPOT-TYPE DISC BRAKE WITH A RETAINING DEVICE FOR A BRAKE PAD

CROSS REFERENCE TO RELATED APPLICATION

This specification claims priority to German Patent Application No. 100 45 358.9, filed on Sep. 14, 2000, entitled "Spot-Type Disc Brake and Associated Brake Pad With a Retaining Device for the Brake Pad.

BACKGROUND OF THE INVENTION

The present invention relates to a spot-type disc brake for automotive vehicles and an associated brake pad with a retaining device for the brake pad according to the preamble of patent claim 1.

A generic spot-type disc brake with a retaining device for a brake pad is disclosed in DE 43 18 744 C1. The spot-type disc brake for automotive vehicles described in this patent comprises a floating caliper with two brake pads which are each slidably guided and supported on a brake carrier that is integrated in the steering knuckle of the automotive vehicle. The floating caliper includes a hydraulic actuating unit with a brake piston for the direct application of the first brake pad, while the second brake pad, upon brake actuation, is moved in a known fashion by axial displacement of the floating caliper indirectly into abutment with a brake disc that rotates inbetween the brake pads. The brake pads are secured to the brake piston or floating caliper by way of combined spring elements, on the one side, and clamped with respect to the brake carrier, on the other side. The piston-side brake pad is retained axially and pressed radially against the brake carrier by means of the spring element with respect to the brake disc. The radial and tangential clamping engagement of the spring element in the piston causes undesirable transverse forces on the brake piston which tilt the latter and, thus, cause disadvantageous friction forces during piston movement. Further, manufacturing tolerances may result in an offset positioning in a circumferential direction of the brake pad and the actuating unit. This means there result further undesirable transverse forces on the piston. This causes a loss in clearance which is responsible for washouts on the brake disc and, hence, undesirable brake torque variations. The result of such brake torque variations is, for example, the occurrence of undesirable vibrations such as torsional vibrations of the steering wheel which may lead to low-frequent humming noise.

Further, it is known from DE 196 17 373 C2 to secure the piston-side brake pad to the brake piston by way of a mounting element which is fixed with a limited clearance to the brake pad vertically to the axial direction. Due to the limitation of this clearance, the brake piston is, however, also in this arrangement loaded with a force vertically relative to the axial direction because the mounting element also applies a radial force component to the brake pad. Resulting therefrom are the undesirable tilting moments that act on the brake piston (as described hereinabove) and impair the piston's free slidability in the actuating unit.

In view of the above, an object of the present invention is to provide a retaining device for a brake pad of a spot-type disc brake which provides for the brake pad both an attachment to an actuating means, e.g. a brake piston, and a clamping engagement with a pad mounting support, without exerting a force to the actuating means vertically relative to the actuating direction.

In accordance with this invention, the retaining device for the brake pad which is slidably guided and supported in a pad mounting support of the spot-type disc brake comprises two separate spring means which both together are attached to the brake pad. With respect to an associated brake disc, the brake pad is clamped axially with the actuating means by way of a first spring means, and is clamped with the pad mounting support by way of a second spring means vertically to the axial direction.

The double function of the retaining device for the piston-side brake pad is removed by the use of two spring means which operate independent in their effect. The first spring means ensures the axial attachment of the brake pad to the actuating means, especially the brake piston of an actuating device, while the second spring means clamps the brake pad radially relative to the pad mounting support. The actuating means is not influenced by the force of the second spring means.

An improvement of the spot-type disc brake with a retaining device is achieved in that the first spring means is secured with a clearance to the brake pad vertically to the axial direction or actuating direction. The result is that the force components of the two spring means are generally uninfluenced by one another, and no undesirable force effect occurs on the actuating means, especially the brake piston, due to the spring means.

A favorable embodiment of the spot-type disc brake with a retaining device is achieved because the first spring means has at least two spring arms for the abutment on the actuating means. This allows the brake pad with retaining device to safely cling to the actuating means. Starting from the point of attachment of the spring means to the brake pad, the spring arms extend in a substantially radial direction, and they are distributed particularly evenly over a corresponding circumference. The brake pad is thereby clamped uniformly with respect to the actuating means.

The second spring means is secured to the brake pad without a clearance according to a preferred design of the retaining device. The spring means is in particular riveted to a projection of the brake pad or fixed on the brake pad in a comparable manner. With another portion the second spring means is supported on the actuating means in order to apply the desired force component to the brake pad vertically relative to the axial direction or actuating direction. To realize a low-cost version of the retaining device with a small number of components, the second spring means additionally serves as an attachment means for the first spring means. In detail, the first spring means is retained vertically to the axial direction on the brake pad by means of the second spring means by maintaining a clearance. This causes no radial forces on the actuating means, especially the brake piston.

The two spring means may especially have the configuration as simple wire springs, bow springs or leaf springs, or sheet-metal springs. Of course, still other spring materials which exhibit the above-mentioned construction features are also possible.

Retaining devices with two above-described spring means can favorably be used with brake pads which are arranged on respectively one brake piston of an actuating device. The retaining device of this invention with two separate spring means is, however, not limited to a use in connection with brake pistons. The actuating means by which a corresponding retaining device with its spring means moves into abutment may also be configured as a portion of a brake caliper or brake housing. In such a case, the associated brake pad is retained on the brake caliper by means of the retaining device.

In addition, protection is sought for a corresponding brake pad with a retaining device of the above type. The retaining device, as has already been described, serves for the detachable connection of the brake pad to an actuating means of the spot-type disc brake, the said retaining device comprising a first and a second spring means. According to the present invention, the first spring means clamps the brake pad axially to the actuating means, i.e., a brake piston, while the second spring means clamps the brake pad with respect to the actuating means vertically relative to the axial direction. The first spring means is secured with a clearance to the brake pad by means of the second spring means vertically relative to the axial direction. This permits a relative displacement between the two spring means, with the result that mutual influencing of the two spring means is prevented. Preferably, the first spring means is secured to the brake pad also with an axial clearance by means of the second spring means. In particular, the first and the second spring means are secured to the brake pad in an unrotatable fashion, with respect to a rotation about the axial direction, in order to accomplish a safe support on the brake pad. Advantageously, the first and the second spring means are unrotatably connected to each other already before they are secured to the brake pad. This simplifies handling of the two spring means in general and their assembly.

Favorable embodiments of the present invention will be illustrated in the accompanying drawings and explained in detail hereinbelow.

BRIEF DESCRIPTION OF THE DRAWINGS

FIG. 3 shows a first design of a first spring means with two spring arms in two views;

FIG. 4 shows a second design of a first spring means with three spring arms in two views;

FIG. 5 shows a design of a second spring means in two views; and

FIG. 6 shows another favorable design of the two spring means in three views.

DETAILED DESCRIPTION OF THE PREFERRED EMBODIMENT

Figure 1A:
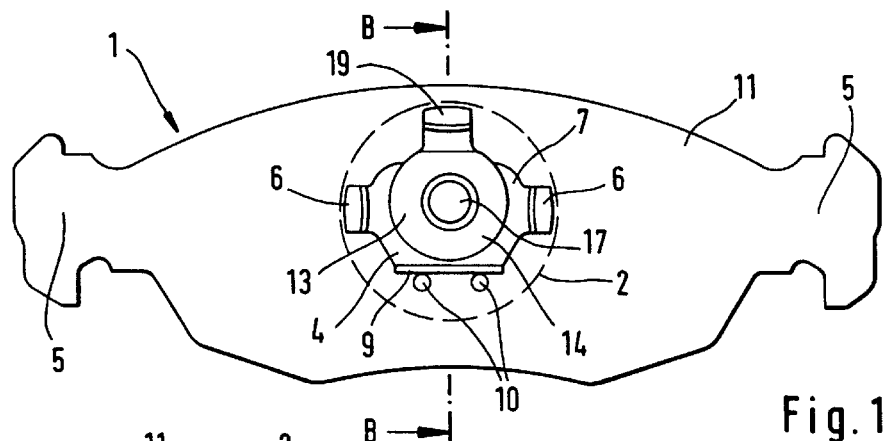
FIG. 1 shows two partial cross-sectional views of a brake pad with a retaining device according to the present invention and a brake piston (shown in dotted lines)

The embodiments of the brake pad with a retaining device as shown in: FIGS. 1 to 6 are appropriate for application in a generic spot-type disc brake, as it is e.g. known from the above-mentioned state of the art of U.S. Pat. No. 5,860,495. The basic mode of operation of a spot-type disc brake of this type is sufficiently known in the art and, therefore, need not be described herein. A spot-type disc brake of this type usually comprises a brake caliper with at least one actuating device for the displacement of at least one brake pad 1 to urge the latter against an associated brake disc (not shown). For this purpose, the actuating device includes an actuating means which is slidably arranged in the brake caliper, which is detachably coupled to the brake pad 1 and is frequently configured as brake piston 2. Lateral projections 5 of the brake pads 1, which are arranged on either side of the brake disc, are axially slidably received in a pad mounting support of the spot-type disc brake and supported in the circumferential direction of the brake disc. Such a pad mounting support can either be integrated into the brake caliper, such as in fixed-type calipers, or can be designed on a brake mounting element separated from the brake caliper, such as e.g. in floating calipers.

It is necessary in such designs of spot-type disc brakes to detachably fix the brake pad 1 in position on the associated actuating means, in particular, brake piston 2 or a portion of the brake caliper. A first spring 4 which is configured as a sheet-metal spring is provided for the connection between the brake pad 1 and the actuating means, i.e., especially brake piston 2, in the actuating direction or axial direction 3 with respect to the associated brake disc. The first spring means 4 is only used for clamping the brake pad 1 in an axial or actuating direction 3 on the associated brake piston 2. To this end, the first spring 4 includes at least two spring arms 6 which extend substantially in a radial direction starting from a base portion 7. Basically, as is seen in FIG. 4, also the design of three or more spring arms 6 is possible. It is advisable to distribute the spring arms 6 evenly over the circumference around the center of the first spring 4. The spring arms 6 abut respectively on brake piston 2. As illustrated in FIG. 1b, they preferably engage into a circumferential groove 8 or other recess on brake piston 2 in order to clamp the brake pad 1 axially with respect to the actuating means. The spring arms 6 can get hooked especially easily on the actuating means due to the groove 8 or recess. With its base portion 7, the first spring 4 with clearance "s" is undetachably secured to the brake pad 1 vertically relative to the axial direction 3. Possible tolerance differences can be compensated thereby, and no undesirable transverse forces are transmitted by way of the brake pad 1 to the brake piston 2, vertically to the axial direction 3. For the anti-torsion positioning of the first spring 4 on the brake pad 1, the first spring 4 has a deflected stop 9 which abuts on matingly shaped projections 10 of the carrier plate 11 of the brake pad 1.

The first spring 4 can be manufactured by corresponding shaping from a spring plate in a particularly easy fashion. However, it is principally also possible to use other materials for the first spring 4, especially plastics and spring wire.

For the radial clamping of the brake pad 1 with respect to the pad mounting support, there is provision of a second spring 13 which maintains the brake pad 1 always in abutment with the pad mounting support and, thus, prevents undesirable pad rattling noises. The second spring 13 is also preferably configured as a sheet-metal spring and can be shaped or bent from a simple sheet-metal blank. More specifically, the second spring 13 is fixed without a clearance to a side of a carrier plate 11 of the brake pad 1 which is opposite to a friction lining 12. To this end, second spring 13 includes a base portion 14 with a step 15. Step 15 includes a central through-opening 16 which, during assembly of the retaining device, is penetrated by a projecting pin 17 or projection of the carrier plate 11. At its free end pin 17 is riveted or deformed after the fitment of the two springs 4 and 13 in order to thicken the free end and, thus, prevent the springs 4 and 13 from sliding off the pin 17 or its projection. Additionally, the second spring 13 is secured to the carrier plate 11 of the brake, pad 1 in a clearance-free and undetachable manner by way of the riveting or deforming operation. To economize the additional operation of riveting, a separate locking washer or a retaining clip may be provided which is hooked on the pin and, thus, fixes the springs 4 and 13 in position on the brake pad 1. Besides, a separate rivet or notched nail can be used to attach the springs 4 and 13 to the brake pad 1. Finally, attachment of the second spring 13 to the brake pad 1 by cementing, soldering, or other connecting operations, is also possible.

Figure 1B:
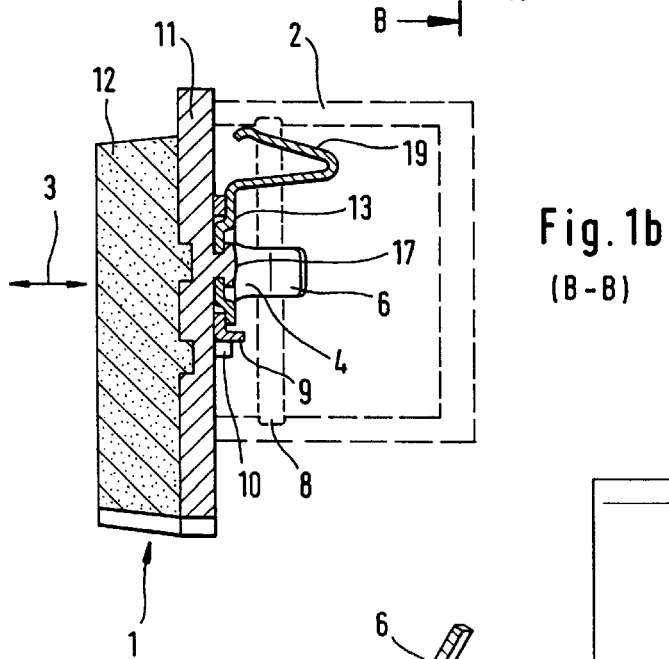
Figure 2:
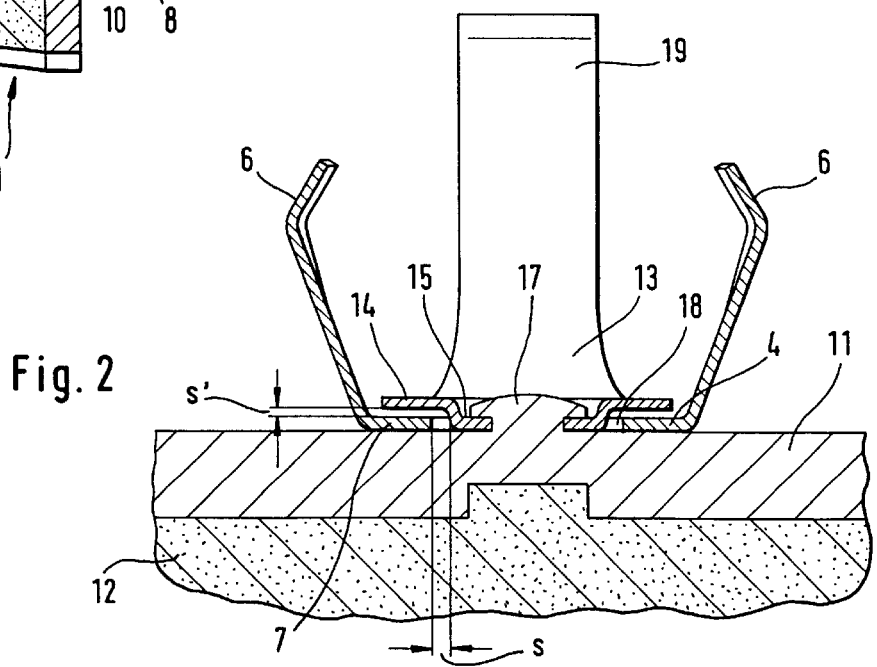
FIG. 2 is an enlarged cross-sectional view of the brake pad with a retaining device.

A design according to FIGS. 1 and 2 has proved to be an especially favorable arrangement. The second spring 13 which is secured to the carrier plate 11 in a clearance-free manner is used as an attaching element for the first spring 4. In the readily assembled condition of the brake pad 1 with a retaining device, the base portion 7 of the first spring 4 extends with a through-opening 18 with a clearance "s" around the step 15 of the second spring 13. A relative displacement of the first spring 4 with respect to the brake pad 1 vertically relative to the axial direction 3 is thereby allowed, for example, for tolerance compensation. This permits compensation of a possible lack in coaxiality between brake piston 2, and the brake pad 1 in the mounted condition in the spot-type disc brake. This effect is assisted in that the first spring 4 is secured to the brake pad 1 also with a small axial clearance "S". Thus, it is ensured that brake piston 2 is not exposed to a force effect vertically to the axial direction 3 due to the attachment of the spring 4 to the brake pad 1.

According to the present invention, the described axial attachment of the brake pad 1 to brake piston 2 by the first spring 4 is combined with an elastic clamping engagement of the brake pad 1 with respect to an associated pad mounting support of the spot-type disc brake by the second spring 13 as in FIG. 5. Principally, the pad mounting support can be integrated either directly into the brake caliper of the spot-type disc brake, as is usual in fixed-type caliper brakes, or it can be configured separately on a separate brake holder. Such a brake holder is frequently employed in floating-caliper spot-type disc brakes and mounted with the vehicle. With two holder arms of a brake caliper, the brake holder straddles the radially outward edge of a brake disc (not shown), the said holder arms including recesses or grooves for the accommodation of the matingly configured lateral projections 5 of the brake pad 1.

The second spring 13 serves for the rattle-free and exact positioning of the brake pad 1 in the pad mounting support. To this end, the brake pad 1 is clamped with the pad mounting support substantially radially, with respect to the associated brake disc. The second spring 13 is preferably shaped or bent from a spring plate and includes at least one portion which is especially configured as spring arm 19. To ensure a soft spring characteristics, the spring arm 19 must have a design as long as possible in order to be able to compensate occurring tolerances due to the clearance-free attachment of the second spring means 13 on the brake pad 1. A spring arm 19 which is bent like a V or W is especially advantageous in this respect. However, a design of the spring arm 19 according to the present invention is of course not limited to these design forms.

Other design forms for the second spring means are principally also possible, and radial clamping between the brake pad 1 and the pad mounting support is achieved, on the one hand, while the free slidability of the brake pad 1 within the pad mounting support must not be impaired by excessive spring forces, on the other hand.

The two springs 4 and 13 are preferably made from a spring plate. Besides, they may generally be likewise fabricated from spring wire or any other appropriate materials, such as plastics.

The combination of the two mentioned spring 4 and 13 ensures both an axial fixation of the piston-side brake pad 1 on brake piston 2 and a suspension of the brake pad 1 in relation to the pad mounting support. It is preferred that the brake piston 2 is configured as a brake piston (see FIG. 1) or as a portion of a brake caliper of the spot-type disc brake.

The radial clamping engagement between the brake pad 1 and the pad mounting support by the action of the second spring 13 does not act, as is desired, in the way of transverse forces on the actuating means, especially the brake piston 2, vertically to the axial direction. The free piston movement within the actuating device is hence not influenced disadvantageously.

FIG. 6 shows another design of the retaining device with two springs 23 and 24, the two springs 23 and 24 being interconnected already before their securement to the brake pad. The first spring 24 includes in a known fashion two laterally extending spring arms 6' which start from a base portion 7' and bias the especially brake pad (not shown) in the axial direction 3 against an actuating means, e.g., brake piston or brake caliper. The two springs 23 and 24 can be fixed unrotatably on the brake pad by means of the second spring 23, as described hereinabove. To this end, the second spring 23 has centrally in its base portion 14' a multi-cornered, e.g. square, opening 25 which is filled by a projection of the brake pad in a form lock after the attachment of the retaining device to the brake pad. After the attachment to the brake pad, the second spring 23 is retained in a form lock on the brake pad, while the first spring 24 can displace relatively thereto within limits.

For the unrotatable interconnection of the two springs 23 and 24, the second spring 23 includes at least one tongue 26 which starts from the base portion 14' and extends into an associated slot 27 of the first spring 24. The two springs 23 and 24 are thereby interconnected and form a preassembled construction unit which is easier to handle and mount. Of course, other appropriate measures are also possible for the unrotatable connection of the two springs 23 and 24, for example, by. designing corresponding projections or stops on the springs 23 and 24. Further, for additional reinforcement, depressions 28 are shaped especially on the first spring 24 to impart higher rigidity above ail to the base portion 7'.

What is claimed is:

1. A spot-type disc brake comprising a brake pad and a retaining device for the brake pad which is slideably guided and supported in a pad mounting support of the spot-type disc brake, and at least one actuating means for displacement of the brake pad in an axial direction, wherein said retaining device comprises a first spring and a second spring which are attached to the brake pad, wherein the brake pad is clamped axially to the actuating means by way of the first spring that includes a clearance with the brake pad vertically to the axial direction allowing the first spring to shift with respect to the brake pad, and the brake pad is clamped to the pad mounting support by way of the second spring vertically to the axial direction.

2. A spot-type disc brake as claimed in claim 1, wherein the first spring has at least two spring arms for abutment on the actuating means.

3. A spot-type disc brake as claimed in claim 1, wherein the second spring is secured to the brake pad without a clearance.

4. A spot-type disc brake as claimed in claim 3, wherein the second spring includes at least one spring portion for support on the actuating means.

5. A spot-type disc brake as claimed in claim 1, wherein the first spring is secured to the brake pad by the second spring.

6. A spot-type disc brake as claimed in claim 1, wherein the first and second springs are formed of sheet-metal or wire spring.

7. A spot-type disc brake as claimed in claim 1, wherein the actuating means is a brake piston.

8. A spot-type disc brake as claimed in claim 1, wherein the actuating means is a portion of a brake caliper.

9. A brake pad for a spot-type disc brake comprising a retaining device for detachable connection to an actuating means of the spot-type disc brake, said retaining device comprising a first spring and second spring such that the first spring clamps the brake pad with respect to the actuating means in an axial direction and the second spring clamps the brake pad with respect to the actuating means vertically to the axial direction, said first spring providing a clearance vertically to the axial direction and being secured to the brake pad by the second spring.

10. A brake pad as claimed in claim 9, characterized in that the first and the second springs are secured to the brake pad in an unrotatable manner with respect to a rotation about the axial direction.

11. A brake pad as claimed in claim 9, wherein the first spring and the second spring are unrotatably interconnected.

\* \* \* \* \*

UNITED STATES PATENT AND TRADEMARK OFFICE
CERTIFICATE OF CORRECTION

PATENT NO. : 6,634,469 B2
DATED : October 21 2003
INVENTOR(S) : Karl Storzel, Holger Krug and Rudolf Plazer It is certified that error appears in the above-identified patent and that said Letters Patent is hereby corrected as shown below:

Title page,
Item [30], Foreign Application Data, "100 45 358" should be changed to -- 100 45 358.9 --.
Item [56], References Cited, U.S. PATENT DOCUMENTS, after "Oltmanns" insert -- Jr. --.

Column 7,
Line 10, after "clearance", insert -- with the break pad --.

Column 8,
Line 1, after "direction", insert -- allowing the first spring to shift with respect to the brake pad --.

Signed and Sealed this

Sixth Day of December, 2005

JON W. DUDAS
*Director of the United States Patent and Trademark Office*